United States Patent [19]
Sundquist

[11] Patent Number: 5,809,872
[45] Date of Patent: Sep. 22, 1998

[54] FOOD PROCESSOR

[75] Inventor: Jarl Sundquist, Sollentuna, Sweden

[73] Assignee: AB Hällde Maskiner AB, Kista, Sweden

[21] Appl. No.: 872,918

[22] Filed: Jun. 11, 1997

[51] Int. Cl.⁶ .............. A23N 1/00; A23N 1/02; A47J 27/00; A47J 27/09
[52] U.S. Cl. .............. 99/492; 99/348; 99/510; 366/199; 366/205; 366/314; 366/601; 241/37.5; 241/92
[58] Field of Search .............. 99/484, 492, 537, 99/538, 584, 509–513, 348; 366/199–206, 144–146, 209, 210, 314, 601; 241/37.5, 92, 199.12, 282.1, 282.2

[56] References Cited

U.S. PATENT DOCUMENTS

| | | | |
|---|---|---|---|
| 3,809,325 | 5/1974 | Marrie | 366/206 X |
| 3,892,365 | 7/1975 | Verdun | 241/92 X |
| 4,111,372 | 9/1978 | Hicks et al. | 241/37.5 |
| 4,487,509 | 12/1984 | Boyce | 366/199 |
| 4,502,377 | 3/1985 | Hall, Jr. | 99/492 |
| 4,681,030 | 7/1987 | Herbert | 99/484 |
| 4,921,174 | 5/1990 | Okada et al. | 366/601 X |
| 4,921,175 | 5/1990 | Okada et al. | 241/37.5 |
| 4,941,403 | 7/1990 | Cimenti | 99/510 X |
| 5,031,518 | 7/1991 | Bordes | 366/314 X |
| 5,184,893 | 2/1993 | Steele et al. | 366/209 |
| 5,353,697 | 10/1994 | Venturati et al. | 99/348 X |
| 5,355,784 | 10/1994 | Franklin et al. | 99/492 |
| 5,392,699 | 2/1995 | Tai | 99/492 |

FOREIGN PATENT DOCUMENTS

| | | |
|---|---|---|
| 0571348 | 11/1993 | European Pat. Off. . |
| 0699409 | 3/1996 | European Pat. Off. . |
| WO9524852 | 9/1995 | WIPO . |

*Primary Examiner*—Timothy F. Simone
*Attorney, Agent, or Firm*—Alfred J. Mangels

[57] ABSTRACT

A food processor that includes a machine stand, a basin, or jug, for receiving the foodstuff or foodstuffs to be processed, a basin lid, and one or more knives located at the bottom of the basin and driven by a drive shaft that projects up vertically through the bottom of the basin. The machine stand (1) includes a low front part (6) which is adapted to support the basin (2) when the processor is in operation, and a rear upstanding part (7) that extends up to approximately the same level as the upper level of the basin (2) when the basin is placed on the machine stands. A motor (8) is housed in the lower portion of the rear part (7); and a lid holder (9) is mounted at the upper portion of the rear part (7) and can be swung about a horizontal pivot shaft (10) between a raised first pivot position and a lowered second pivot position (FIG. 2 *d*). The lid holder (9) is adapted to coact with the lid (3) in a manner such that the lid holder will be located in a predetermined position of rotation of the pivot shaft between the first and the second pivot position when the basin (2) is supported by the machine stand and the lid (3) is fitted to the basin. The pivot shaft (10) of the lid holder (9) is adapted to coact with a switch (11) such that the switch will be actuated, so that the machine can be started, solely when the lid holder (9) is positioned so that the pivot shaft is located in the predetermined position of rotation.

8 Claims, 4 Drawing Sheets

FOOD PROCESSOR

BACKGROUND OF THE INVENTION

1. Field of the Invention

The present invention relates to a food processor, and more specifically to a food processor of the mixer or blender type that include food cutting means. The invention is particularly concerned with a safety arrangement in such food processors.

2. Description of the Related Art

Such food processors are of the type in which the foodstuff or foodstuffs to be prepared are in or are fed down into a container in the form of a basin or jug, in which a cutting tool is placed on the bottom of the basin. Such machines also include a lid that is intended to be fitted to the basin when the machine is to be used.

Such machines are designed for use in so-called industrial kitchens and also for domestic use. A common feature of these machines is that the cutting tool at the bottom of the basin normally includes two knives that rotate at high speeds, typically at speeds of up to 15,000 r.p.m. The knives are sharp and consequently the machine must be constructed to prevent the fingers or the hand of the person operating the machine coming into contact with the knives when the machine is in use.

Such blenders will normally have a tall basin or jug that projects up from the stand and is held against rotation at its lower end on the machine stand. The basin is intended to be fitted with a lid when it is in use. The knives at the bottom of the basin are connected to a coupling device beneath the basin by means of a connecting shaft. When the basin is fitted to the machine stand, the coupling device engages a further coupling device that is connected to the motor of the machine via a drive shaft.

It is necessary for the lid to be in place on the basin while the machine is being used, so as to prevent accidents that may occur by unintentionally inserting a hand down to the location of the knives when the lid is not fitted.

A known solution in this regard is one in which the lid coacts mechanically with a mechanical device in the form of a rod provided on the handle of the basin or jug, this rod functioning to actuate a switch in the machine when the basin and lid are in place. It is necessary to actuate the switch in this way in order to be able to start the machine.

One serious drawback with this solution is that the safety arrangement incorporated in the basin includes movable parts that may cause the safety arrangement to malfunction. For instance, the rod may remain in its lower position as a result of foodstuff or dirt caked thereon.

Another known solution is one in which a vertical arm projects up from the machine, said arm being drawn up and in over the lid against a spring force, wherein the lower end of the arm actuates a machine-mounted switch that enables the machine to be started. The basin itself includes no actual safety means. However, this solution has another type of drawback, namely its instability as a result of the height of the machine and the basin together, coupled with the fact that the person operating the machine is required to pull the upper part of the arm upwards and in over the lid. This can cause the machine to topple over, and therewith constitutes a serious accident risk.

This instability is a general problem with all known blenders, due to the basin being positioned on a relatively tall machine.

SUMMARY OF THE INVENTION

The present invention provides a blender-type food processor in which the basin and the lid are not included in the actual safety arrangement, while providing a machine whose center of gravity is lower than that of known machines and therewith provide a more stable machine.

The present invention thus relates to a food processor of the kind that includes a machine stand, a basin or jug that receives the foodstuff or foodstuffs to be prepared, a basin lid, and one or more knives located at the bottom of the basin and driven by a drive shaft which projects up vertically through the bottom of the basin. The machine stand includes a front low part which is adapted to support the basin in operation, and a rear upwardly projecting part that extends to approximately the same level as the upper level of the basin when the basin is fitted to the stand. The machine motor is placed in the rear part of the stand, and a lid holder is provided at the upper portion of the rear part, wherein the lid holder can be swung about a horizontal axis between a raised first position and a lowered second position. The lid holder is adapted to coact with the lid such that the lid holder will be located in a predetermined position of rotation between the first and the second positions when the basin is carried by the machine stand and the lid is fitted to the basin. The pivot shaft of the lid holder is adapted to coact with a switch in a manner such that the switch will only be actuated to enable the machine to be started when the lid holder is in a predetermined position of rotation.

BRIEF DESCRIPTION OF THE DRAWINGS

The present invention will be described in more detail with reference to an exemplifying embodiment thereof and also with reference to the accompanying drawings, in which.

DESCRIPTION OF THE PREFERRED EMBODIMENTS

Figure 1A:
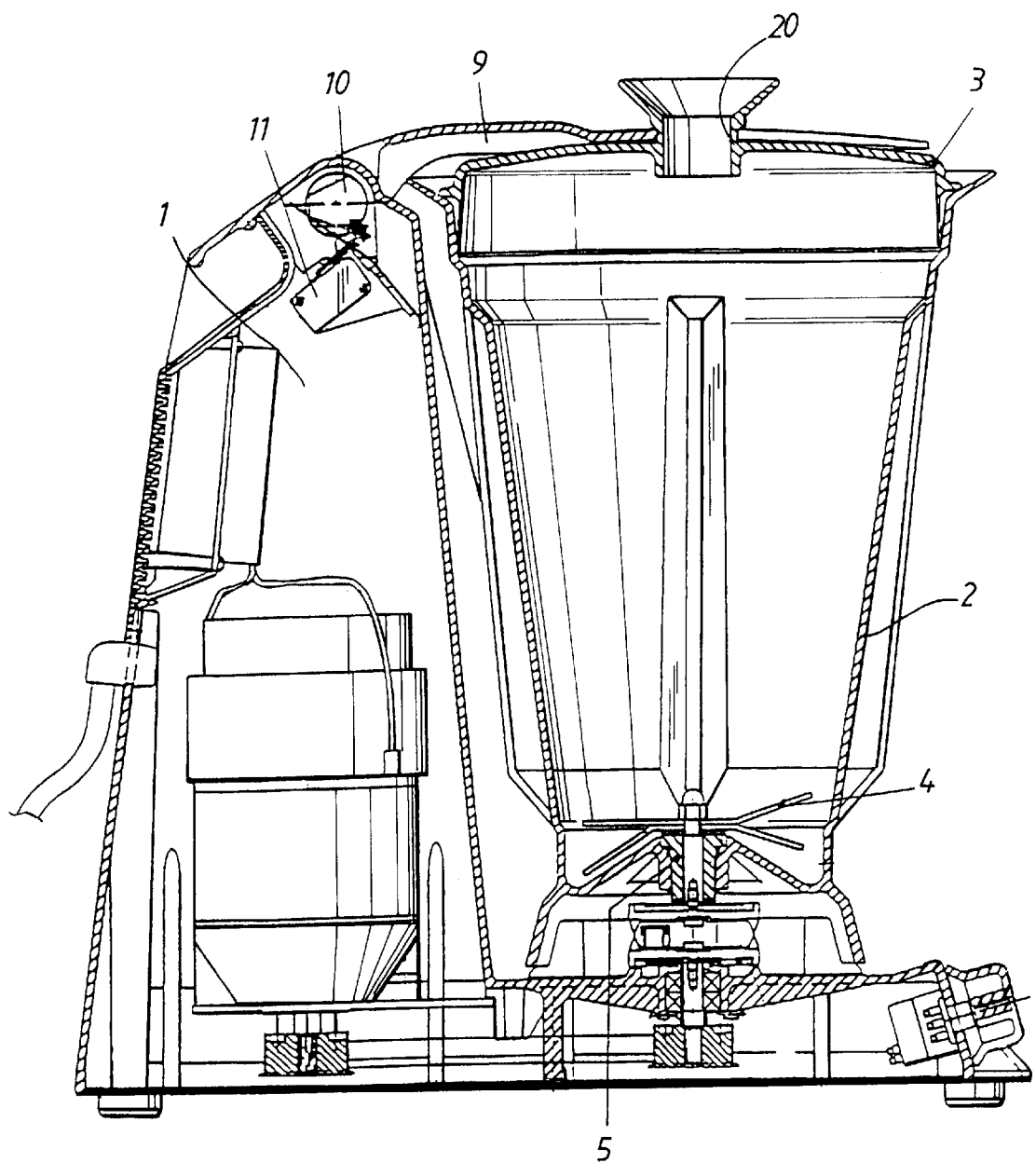
FIG. 1a is a cut-away side view of an inventive food processor.
Figure 1B:
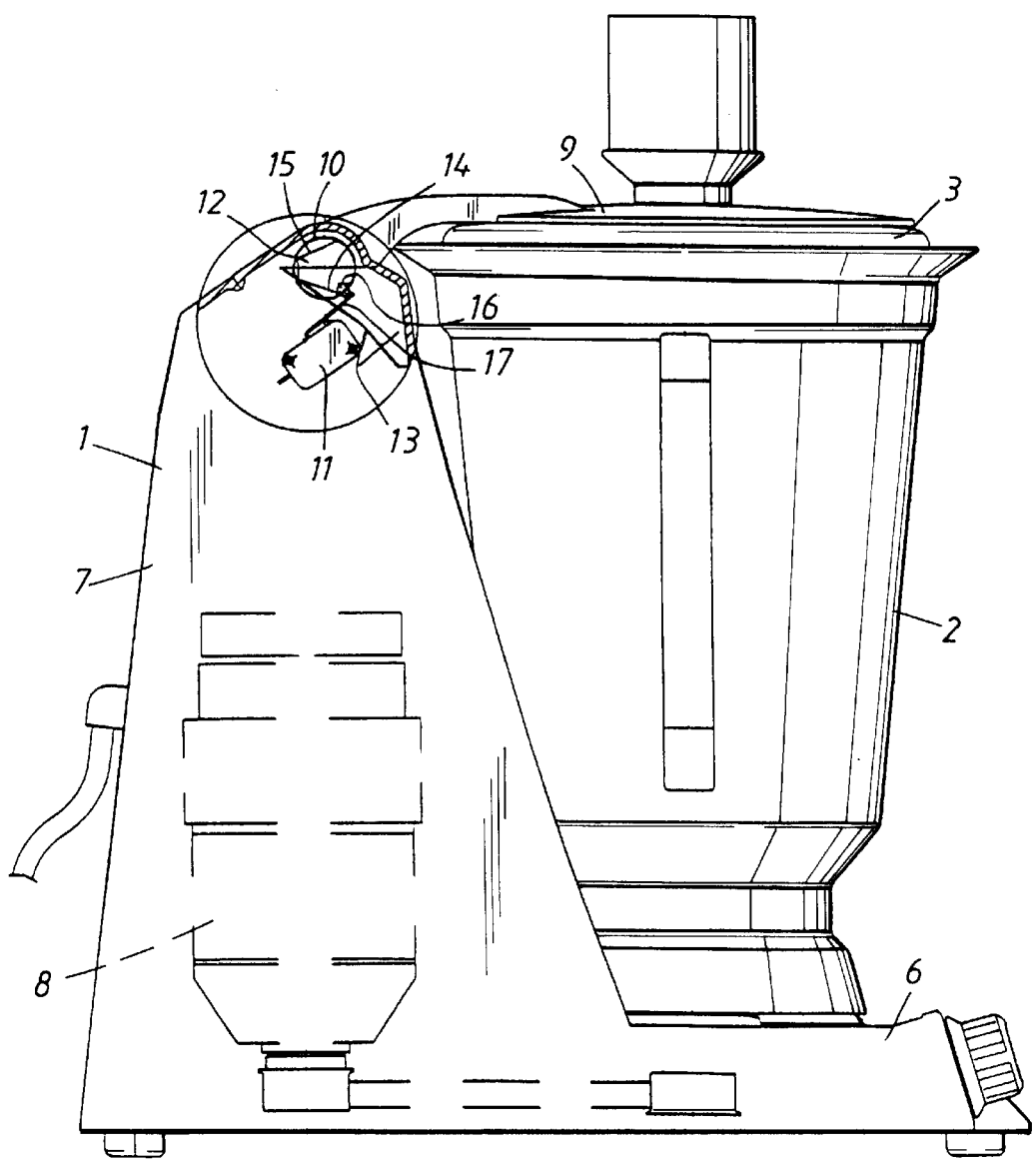
FIG. 1b is a view similar to FIG. 1a but only shows the machine partially cut-away.

The food processor illustrated in FIG. 1a and 1b includes a machine stand 1, a basin or jug 2 for receiving the foodstuff or foodstuffs to be prepared, and a basin lid 3. Mounted on the bottom of the basin 2 are knives 4 that are driven by means of a drive shaft 5 that projects vertically up through the bottom of the basin. The food processor shown in FIG. 1a and 1b is of the blender or mixer kind.

In accordance with the invention, the machine stand 1 includes a front low part 6, see FIG. 1b, which is adapted to support the basin 2 in operation, and a rear upwardly projecting part 7. The rear upwardly projecting part 7 extends to approximately the same level as the upper level of the basin when the basin is placed on the machine stand. The drive motor 8 of the machine is placed in the rear part v. This design has the important advantage of enabling the front low part 6 to be made very low, for instance given a height of only a pair of centimeters. Because the basin is placed on the low front part 6 while the motor 8 is placed in the lower portion of the rear part 7, the combined machine and basin will have a low centre of gravity in comparison with known machines with which the basin, or jug, is placed on a relatively tall machine stand that includes the motor.

Figure 2A:
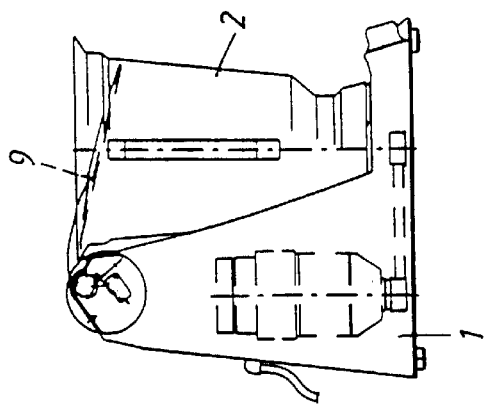
FIGS. 2a–2d show the machine of FIG. 1 with a lid holder in different positions.
Figure 2B:
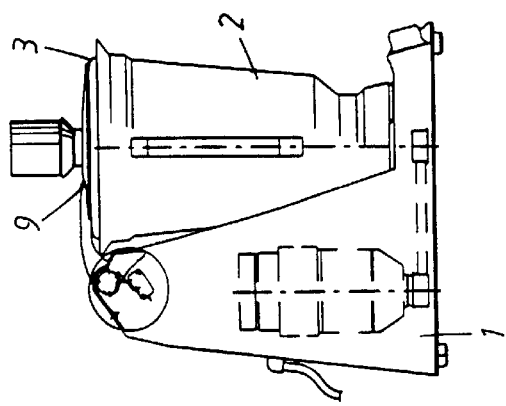

The inventive machine also includes a lid holder 9 at the upper portion of the rear part 7. The lid holder 9 can be swung about a horizontal shaft 10, between a raised first position, shown in FIG. 2a, and a lowered second position shown in FIG. 2d.

Figure 2C:
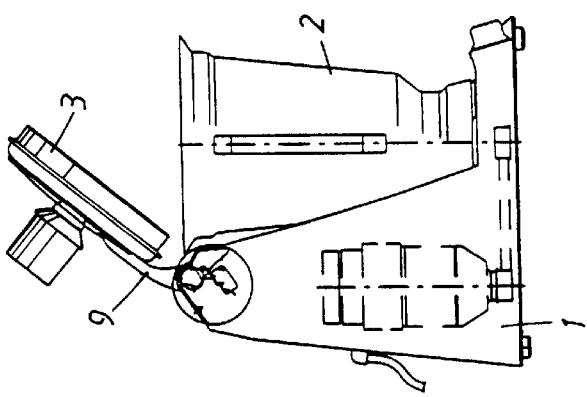

The lid holder 9 is adapted to coact with the lid 3 such that the lid holder will be located in a predetermined position of rotation (shown in FIG. 2c) when the basin 2 is supported by the machine stand 1 and the lid 3 is supported by the lid holder, and when the lid holder is swung down so as to fit the lid on the basin 2. This predetermined position of rotation lies between said first and said second pivot positions.

The pivot shaft 10 of the lid holder is adapted to coact with a switch 11 in a manner such that the switch will be actuated to enable the machine to be started only when the lid holder 9 is located in a predetermined position of rotation. This means that the machine cannot be operated when the lid holder is located in a position of rotation other than said predetermined position (shown in FIG. 2c). The machine will thus stop when the lid holder 9 is lifted.

The switch 11 is positioned in the machine stand 1.

Figure 2D:
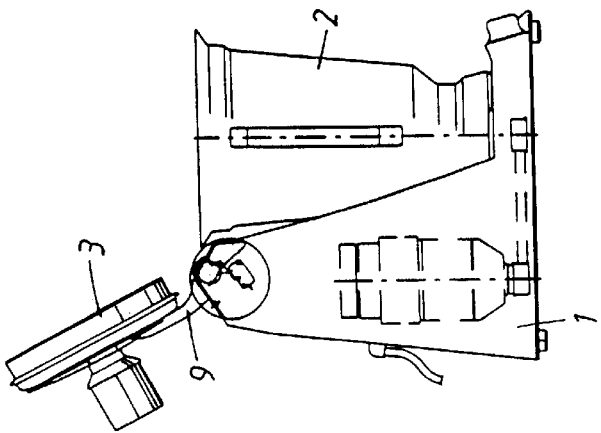

It is of utmost importance that when the basin is placed on the machine without the lid being fitted on the basin, the lid holder when folded down will assume said second pivot position, in which the lid holder has passed said lowered predetermined position of rotation. This lowered second position of the lid holder is shown in FIG. 2d. The machine cannot be started in this state, i.e. when the lid has not been placed on the basin.

According to one preferred embodiment of the invention, the pivot shaft 10 of the lid holder 9 includes a cam 12 and a spring 13 that are adapted to coact with the lid holder 9 and cause the lid holder to remain in said first or said second pivot positions, respectively. FIG. 1b shows two camming surfaces 14, 15 which coact with a leaf spring 13. The camming surface 14 coacts with the spring so as to drive the lid holder to its second, lower-most, pivot position, shown in FIG. 2d, when the lid holder is swung down without the basin and the lid being in place on the machine. The camming surface 15 coacts with the spring to hold the lid holder in its first pivot position, shown in FIG. 2a.

The shaft 10 includes a recess or notch 16 which is intended to coact with the outer end of an arm 17 belonging to said switch.

When the outer end of the arm is located in the recess 16, the switch 11 is actuated so as to enable the machine to be operated. This position is reached only when the lid holder is located in said predetermined position of rotation, shown in FIG. 2c.

Figure 3:
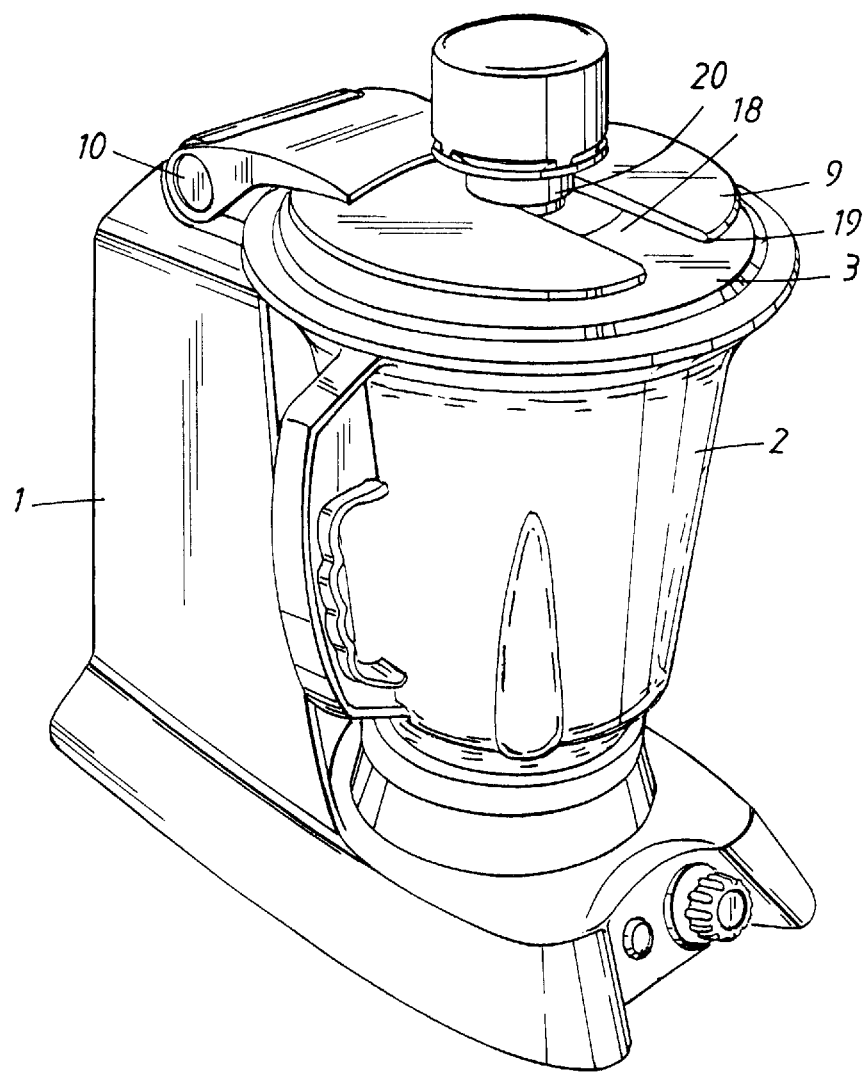
FIG. 3 is a perspective view of an inventive machine.

According to one preferred embodiment of the invention, that part of the lid holder 9 which coacts with and supports the lid 3 is disc-shaped and has a radial groove 18 that extends from the periphery 19 of the disc-shaped lid holder in towards the center of said holder, see FIG. 3. The groove 18 is intended to coact with a part 20 that projects up from the upper side of the lid 3. This enables the lid to be removed easily from the lid holder and replaced thereon. This embodiment of the lid holder also prevents a person placing his/her hand in the basin and in contact with the knives when the lid holder is positioned above the basin opening. Thus, if a person should hold the lid holder in its predetermined position of rotation without the lid holder supporting a lid, therewith enabling the machine to be started, the person concerned will be unable to insert his/her hand into the basin and be injured as a consequence thereof.

It will be evident that neither the lid nor the basin form a part of the actual safety arrangement and can therefore be handled and washed independently of such safety aspects.

It will also be evident that the machine and basin combination will form a unit that has a low center of gravity.

The present invention thus eliminates the drawbacks mentioned in the introduction and associated with food processors of the present kind.

Naturally, the present invention can be modified with respect to different part-solutions without departing from the inventive concept.

The present invention shall not therefore be considered limited to the aforedescribed and illustrated exemplifying embodiments thereof, since modifications can be made within the scope of the following Claims.

What is claimed is:

1. A food processor comprising: a machine stand including a low front part for supporting a basin, and a rear upstanding part; a basin having a bottom and an open top for receiving foodstuffs to be processed; a basin lid engageable with the basin top; a drive shaft that projects up vertically from the machine stand and through the bottom of the basin, and at least one knife located at the bottom of the basin and driven by the drive shaft, wherein the rear upstanding part of the machine stand extends upwardly to substantially the level of the basin top when said basin is placed on the low front part of the machine stand; a drive motor positioned in a lower stand portion of the rear upstanding part of the stand; a pivot shaft rotatable carried in the upper stand portion; a lid holder carried on the pivot shaft for pivotal movement with the pivot shaft between a raised, first lid position and a lowered, second lid position wherein the lid holder is adapted to hold the lid such that when the lid is held by the lid holder and is in place on the basin top the lid holder is in a predetermined position of rotation of the pivot shaft between said first lid position and said second lid position when the basin is supported by the low front part of the machine stand; a switch carried in the rear upstanding part of the machine stand and in contact with the pivot shaft; and wherein the pivot shaft is positioned to actuate the switch, so that the machine can be started only when the lid holder is located in said predetermined position of rotation, to enable the motor to drive the at least one knife.

2. A food processor according to claim 1, wherein the pivot shaft includes a cam and a spring is positioned in contacting relationship with the cam to stop rotation of the pivot shaft when the lid holder is in each of its first and its second pivot positions.

3. A food processor according to claim 1, wherein the lid holder includes a groove that extends inwardly from peripheral edge thereof; and wherein the groove is engageable with the lid to hold the lid as the lid holder is moved between its first and second pivot positions.

4. A food processor according to claim 3 wherein the lid holder includes a disc-shaped portion adapted to overlie the basin opening when the basin is in operative position on the machine stand.

5. A food processor according to claim 4, wherein the groove extends radially inwardly from a peripheral surface of the disc-shaped portion.

6. A food processor according to claim 3, wherein the lid includes and upward projection and the groove of the lid holder slidably receives the projection to hold the lid in position relative to the lid holder.

7. A food processor according to claim 2, wherein the cam includes first and second cam surfaces, and wherein when the spring contacts the first cam surface the lid holder is held by the spring in its first position and when the spring contacts the second cam surface the lid holder is held by the spring in its second position.

8. A food processor according to claim 1, wherein the pivot shaft includes a notch, and wherein the switch includes an arm that is engageable with the notch to actuate the switch and permit operation of the drive motor when the switch arm is in engagement with the pivot shaft surface.

* * * * *

UNITED STATES PATENT AND TRADEMARK OFFICE
CERTIFICATE OF CORRECTION

PATENT NO.   : 5,809,872
DATED        : September 22, 1998
INVENTOR(S)  : Jarl Sundquist It is certified that error appears in the above-indentified patent and that said Letters Patent is hereby corrected as shown below:

On the title page, insert the following item:

[30] Foreign Application Priority Data

June 12, 1996 [SE] Sweden....................9602321

Column 4, line 26, "rotatable" should read --rotatably--;

Column 4, line 29, after "position" insert --;--;

Column 4, line 42, after "cam" insert --,--;

Column 4, line 47, after "from" insert --a--.

Signed and Sealed this

Sixth Day of July, 1999

Q. TODD DICKINSON

Attest:

Attesting Officer     Acting Commissioner of Patents and Trademarks